FIG. I

INVENTOR.
WILLIAM B. RETZ
BY
Mitchell & Bechert
ATTORNEYS

March 19, 1963

W. B. RETZ 3,081,523

SPINDLE ACCELERATING AND BRAKING SYSTEM

Filed March 31, 1960

INVENTOR.
WILLIAM B. RETZ
BY
Mitchell & Bechert
ATTORNEYS

March 19, 1963 W. B. RETZ 3,081,523
SPINDLE ACCELERATING AND BRAKING SYSTEM
Filed March 31, 1960 5 Sheets-Sheet 4

INVENTOR.
WILLIAM B. RETZ
BY
Mitchell & Bichert
ATTORNEYS

March 19, 1963 W. B. RETZ 3,081,523
SPINDLE ACCELERATING AND BRAKING SYSTEM
Filed March 31, 1960 5 Sheets-Sheet 5

INVENTOR.
WILLIAM B. RETZ
BY
Mitchell & Buchert
ATTORNEYS

3,081,523
SPINDLE ACCELERATING AND BRAKING SYSTEM

William B. Retz, Plainville, Conn., assignor to The New Britain Machine Company, New Britain, Conn., a corporation of Connecticut
Filed Mar. 31, 1960, Ser. No. 19,023
10 Claims. (Cl. 29—38)

The present invention relates to a system for accelerating and braking of spindles and in particular to means for accelerating and braking individual spindles in a multiple-spindle machine. Specifically, in a multiple-spindle machine wherein there is a continual driving of a plurality of spindles periodically indexed from one station to another including a chucking or loading station where a spindle is at least for a time stationary, the present invention is concerned with means for accelerating a spindle, after being stopped at the loading station, up to a common spindle driving means for an operation in a first machining station to which the spindle is indexed; and also for braking a spindle to a stop, after disengagement from the driving means, and indexing to a loading station has occurred.

In machines of the character disclosed in the Gridley et al. U.S. Patent No. 2,055,434, a barrel or carrier mounting several work chucking spindles is rotationally indexed periodically to advance each spindle from a loading or chucking station to successive stations for particular machining operations, effected by slide-carried respective tools brought to and retracted from the rotating spindles in timed relation to the carrier indexing. In said patent, a continually driven sprocket chain is trained around sprockets of parallel spindles angularly spaced in the carrier in such fashion that for machining operations at any given time all except one of the spindles are commonly driven at respective stations; while the sprocket of the excepted spindle, at the chucking or loading station, is out of driving engagement with the sprocket chain.

A like manner of operation is attained by the generally similar type of machine disclosed in the Brown et al. U.S. Patent No. 2,083,312, wherein, however gearing is used commonly to drive the individual spindles, a clutch mechanism and brake mechanism being there used at each spindle for making a driving connection to the common power source and braking of a spindle at appropriate times. In the latter type of machine, a drive sleeve coaxial with the rotational axis of an indexing spindle carrier is always meshed with individual input gears of respective spindles, each said input gear being in effect the continually driven and rotated driving clutch element of a spindle clutch controlling the driving of its respective spindle.

Machines of the types disclosed in both of the aforementioned patents, of course, provide chucking means for gripping a work-piece in a rotationally driven relation to each spindle; and also include a timing camming system for synchronizing indexing of the spindle-carrier, and reciprocation of the tool slide. The gear-driven type also includes means for clutching the spindle proper to the driving input of each spindle assembly as well as means for braking a spindle after release from a driven relation.

Now by the present invention, machines of both drive types are provided with means whereby a spindle, stopped at a chucking or loading station, is brought up to driving speed before the spindle is engaged with the common driving means or system, and further, in the preferred form of the invention, a spindle (after release or disengagement from a such common driving means) is rapidly braked to a stopped condition for a loading or unloading operation. In consequence, a higher spindle driving speed is readily attainable for example, on the order of 1000 r.p.m. in comparison with a maximum of about only 320 r.p.m in many cases.

In the case of the gear drive, the individual spindles are driven for the machining operations by the respective continually driven input gear through a positive drive clutch of the spindle unit, and each spindle is brought up to a speed and braked to a stopped condition by an auxiliary mechanism arranged in a by-passing driving relation to the main drive system used for the machining operations.

On the other hand, in the case of the sprocket chain-type drive, in addition to the spindle drive sprocket (which in conjunction with the drive sprocket chain may be considered as a positive clutch means by virtue of the disengagement and engagement of the same upon indexing into and out of a loading station), each spindle unit or assembly includes an accelerating or starting gear engageable by a cammed sliding gear at predetermined time in the indexing cycle for connection with an idler gear operated by an auxiliary spindle starting and braking mechanism controlling the rotational motion of the spindles from the time each is brought into the chucking station to the time each is advanced therefrom to a first work station.

An object of the present invention is to provide in a multiple-spindle machine means for bringing a stopped spindle up to speed before engagement with continually operating driving means. Another object is to provide means for rapidly bringing a spindle to a stop after disengagement from a spindle driving means.

A further object is to achieve higher spindle operating speeds by providing means for accelerating and for braking spindles at the time of indexing out of and into a loading or chucking station. Another object is to achieve in a multiple spindle machine starting and stopping of individual spindles by use of single clutch means and brake means for such purpose. Other objects and advantages will appear from the following description and the drawings, wherein:

FIG. 2A is a side elevation of a spindle clutch actuating cam;

Figure 1:
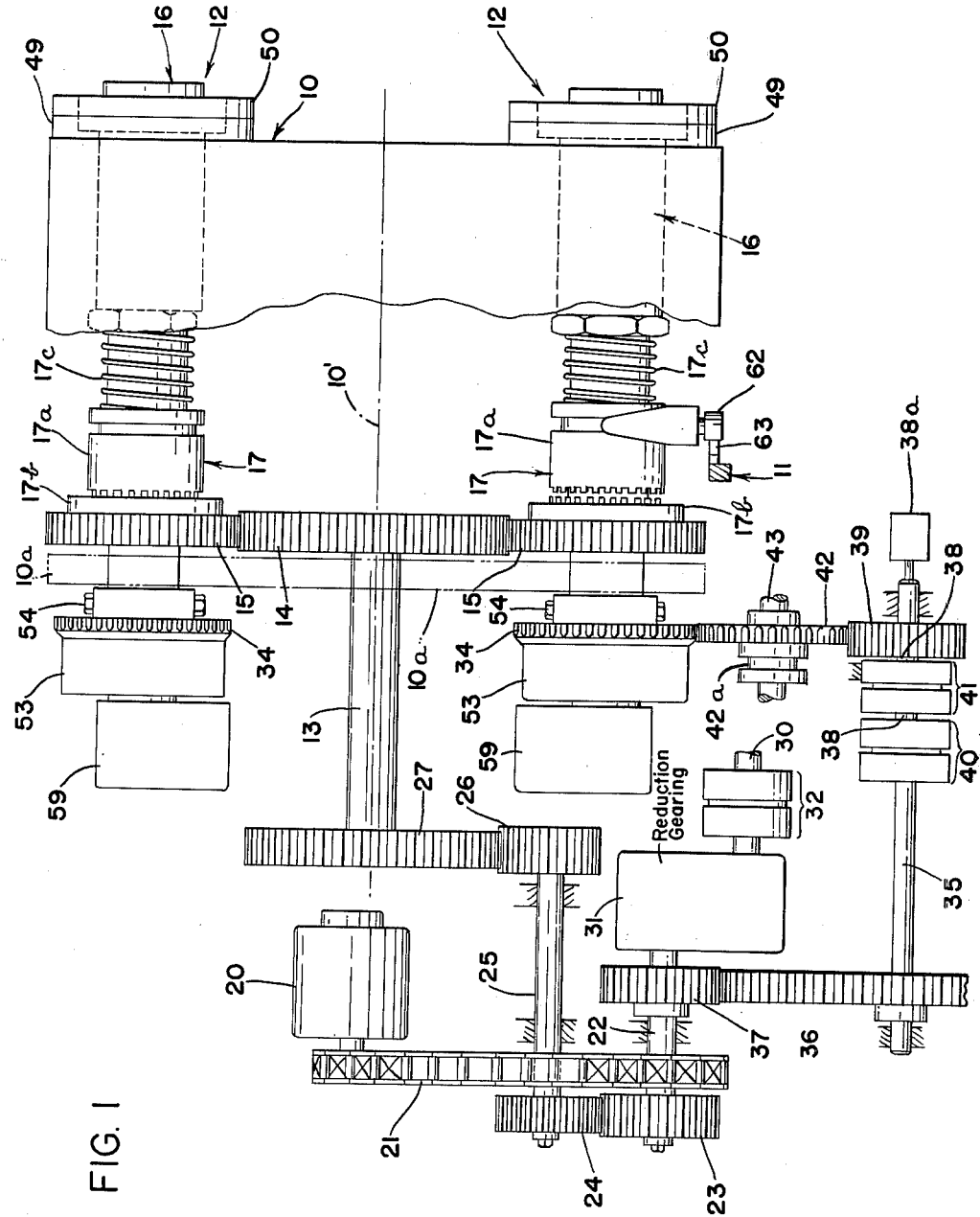
FIG. 1 is a schematic or generalized representation of a drive system for a multiple spindle machine with gearing driven spindles involving the present invention.
Figure 2:
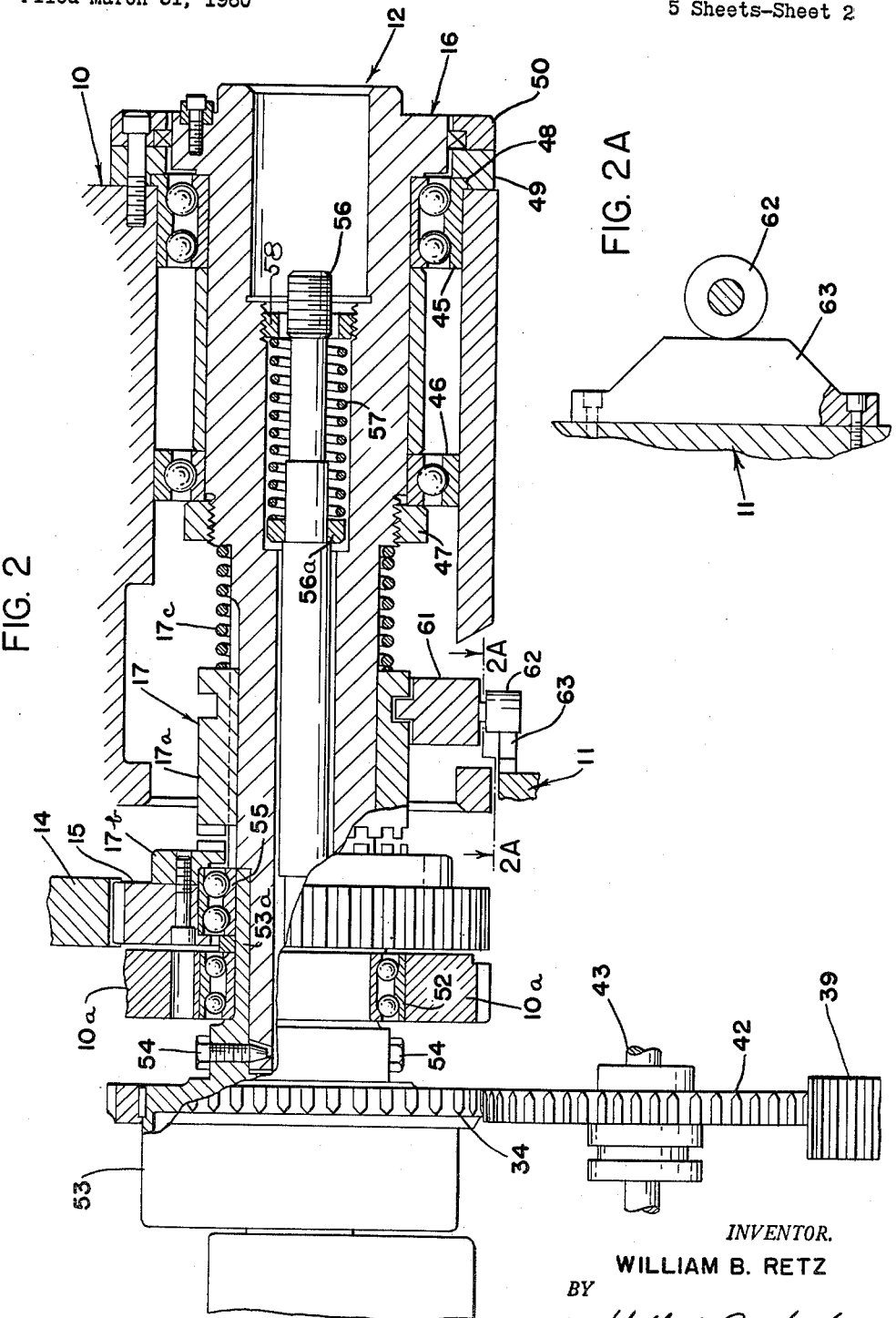
FIG. 2 is a fragmentary detail view of spindle unit in a machine of the type corresponding to FIG. 1.

An embodiment of the invention adapted to a machine with a spindle drive such as that disclosed in the Brown and Retz U.S. Patent No. 2,083,312 of June 8, 1937, is shown in fragmentary FIGS. 1 and 2, wherein the pertinent parts of the main spindle drive mechanism of the latter patent and the present auxiliary spindle starting and braking mechanism are shown in more or less schematic form.

A plurality of like equi-spaced spindle units 12 are individually rotatable in a carrier 10 mounted for rotation on axis 10' in the machine frame, the carrier here shown including a rear plate 10a peripherally toothed to form part of an indexing mechanism such as that disclosed in the Barry and Retz U.S. Patent 2,639,492 of May 26, 1953.

Here a central drive sleeve 13, parallel to the spindles and coaxial with the spindle carrier 10, through a central gear 14 constantly rotates drive or input gears 15 for respective spindle units, the spindles proper 16 being respectively driven through spindle clutches 17 hereinafter described. The central drive sleeve is driven from motor 20 through a sprocket chain connection 21 to a constant speed shaft 22, the speed change gears 23 and 24 on shafts 22 and 25 respectively, and gears 26 and 27 on shaft 25 and the drive sleeve; the constant speed shaft 22 also serving to drive through reduction gearing 31 and a clutch unit 32 other mechanism of the machine including a main cam shaft 30.

Specifically pertinent to the present invention, the spindle clutches 17 are positive clutches, cam actuated as hereinafter detailed relative to FIG. 2, upon indexing rotation of the spindle carrier; and an auxiliary spindle drive and brake mechanism is provided. The auxiliary mechanism includes a starter gear 34 for each spindle, a shaft 35 mounted in the frame and driven by gears 36 and 37 from the constant speed shaft 22, a starting clutch unit 40 for coupling the frame-mounted shafts 35 and 38, a brake unit 41 for braking the latter shaft, a gear 39 secured to the latter shaft and having width sufficient to maintain mesh with gear 42, which is slidable on shaft 43 into and out of engagement with a starter gear 34 of a spindle brought into the loading station.

A speed responsive device 38a driven by or sensing speed of shaft 38 includes a switch 38b actuated at a speed in 38 indicative of attainment of cutting speed by the accelerated spindle, to afford an interlock as later detailed between operation of clutch 40 and the indexing mechanism. The clutch and brake units 40 and 41 are preferably electromagnetic units of self-adjusting types actuated through suitable mechanical-electrical controls at appropriate times as hereinafter described.

The spindle units or assemblies comprise a general structure known to the art. Each includes the forward bearings 45 and 46 spaced by an interposed sleeve and secured between nut 47 and a shoulder on the forward end of the hollow spindle 16; the whole being retained in a corresponding bore of the carrier by a circumferential lip or flange 48 on the outer race of bearing 45 engaged between the carrier face and a clamping ring 49 bolted thereto, a suitable rotary seal assembly 50 being mounted on the ring 49. Rear support is afforded the spindle assembly in plate 10a by bearing 52 on the sleeve-like extension 53a of a chucking cylinder unit 53 keyed on the reduced end of spindle 16 and axially secured thereto by wedging conical or taper point screws 54; the inner races of bearing 52 and of the spindle drive gear bearing 55, with an interposed spacer, being clamped between shoulders on housing 53 and spindle 16 by the action of the taper screws 54. For pneumatically or hydraulically powered or actuated work-piece chucking in a chuck (not shown) to be mounted on the front of the spindle, a rod 56, biased by spring 57 interposed between rod collar 56a and a short sleeve 58 threaded into the spindle bore, connects the piston of unit 53 to reciprocable actuating means of the chuck, the actuating fluid being supplied and exhausted from unit 53 through a rotary connection 59 in a well-known arrangement.

However, here a starter gear is provided on the spindle in the form of a pointed tooth ring gear 34 secured on the housing of unit 53 and thereby to the spindle; and the positive spindle clutch 17 is the only clutch device needed in the assembly. The annular driving clutch element 17b (bolted to one face of the driving gear 15, thereby clamping the outer race of bearing 55) and the driven collar element 17a splined to spindle 16 have opposed dog tooth clutching faces to provide a positive clutch; and normally 17a is slid into engagement by helical clutch spring 17c. For each spindle assembly, there is a clutch fork or yoke 61 axially shiftable in the spindle carrier and engaged in a circumferential groove on the shiftable member 17a; which fork serves as a shipper to disengage the clutch 17 when, upon spindle indexing to the loading station, roller 62 on the shipper encounters a stationary cam 63 fixed at an appropriate location on the machine frame indicated in fragmentary manner at 11.

With the arrangement thus far described, the clutch 17 of a spindle unit being indexed into the loading station is first disengaged by cam 63 to free the spindle 16 from the main drive system. Then sliding gear 42, previously shifted out of the path of the incoming starter gear, is shifted into engagement with the starter gear 34 of the spindle in the loading station, and the brake unit 41 engages to brake shaft 38 to a stop and thereby the spindle also through gears 39, 42 and 34. It should be noted that indexing need not be completed, that the sliding gear can be shifted toward the starting gear, as soon as the relative positions of the gears will permit meshing.

After the previous workpiece has been replaced by a new piece at the loading station, brake 41 is disengaged and then clutch 40 is engaged, so that the spindle at the working station is now driven from constant speed shaft 22 (through gears 37, 36, shaft 35, clutch 40, shaft 38 and gears 39, 42 and 34) for acceleration of the spindle to working speed, before indexing toward the first work station and the concomitant release of clutch 17 into spindle driving engagement occurs. The preferred sequence at this point is that gear 42 be shifted out of mesh with the starter gear 34 and then the clutch 40 be disengaged before indexing again takes place; but in any event 42 is disengaged before the spindle clutch 17 engages.

The sliding gear 42 may be spring biased axially toward the position where it is meshed wtih a spindle starter gear 34 at the loading station, and slid out of such position and released into such meshed relation by a cam mechanism involving a respective cam associated on the spindle carrier with each spindle; such an arrangement being similar to that hereinafter described relative to the embodiment of the invention for the sprocket chain drive of FIGS. 3 and 4. However, the gear 42 may also be shifted out of mesh by a shipper or fork engaged in hub groove 42a and either mechanically or solenoidally actuated at appropriately timed points in the indexing cycle; for which purpose the solenoid may be subject to the control of a limit switch operated by a cam on a main feed control cam shaft or drum, or by cams on the carrier corresponding to respective spindles.

Where the rotational movement of the auxiliary spindle drive is obtained as in FIGS. 1-4 from the main spindle driving mechanism of the machine rather than from an independent motor, the various gearing ratios should of course be such that the ultimate speed of the spindle derived from the auxiliary system will equal the main or cutting speed.

The primary mechanical features of the invention as embodied in a chain-type drive (FIGS. 3 and 4) will be described before setting forth control means for timing operations of the auxiliary spindle driving and braking means relative to each other and to the spindle indexing of the machine incorporating the same.

Figure 3:
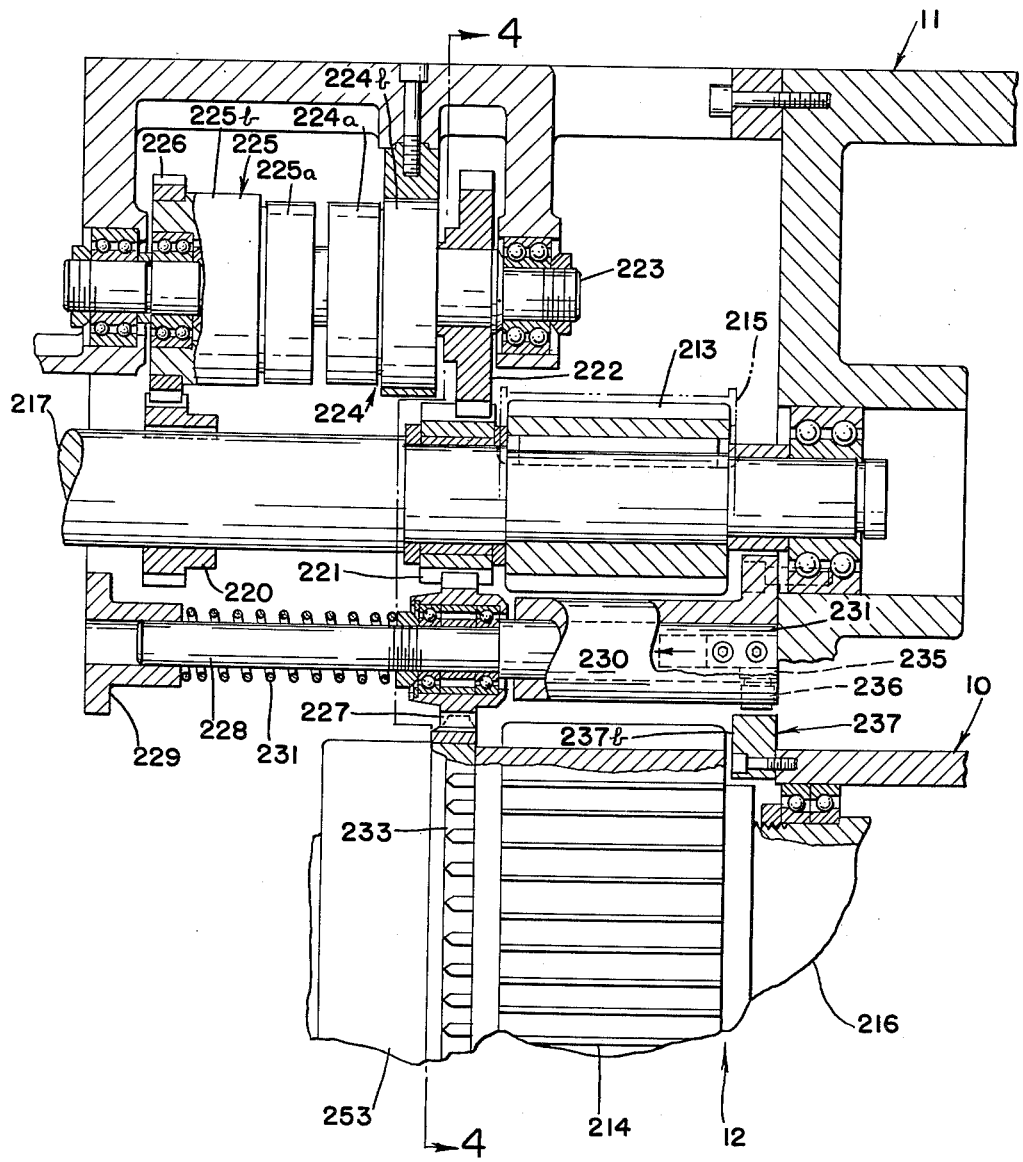
FIG. 3 is a fragmentary representation of a sprocket chain drive for a multiple-spindle machine involving the present invention.
Figures 4, 4A:
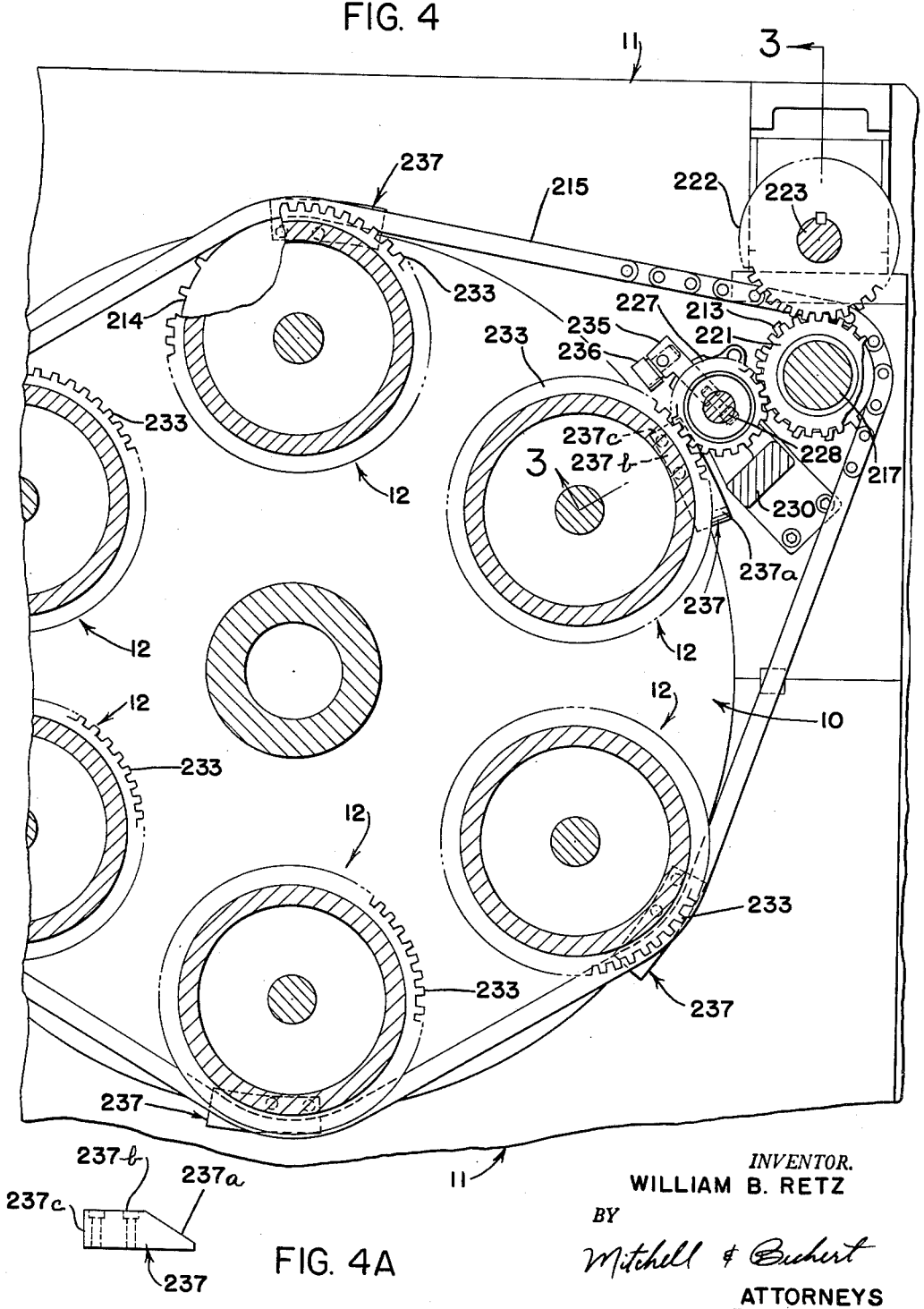
FIG. 4 is a section view taken substantially along the line 4—4 in FIG. 3.
FIG. 4A is a side elevation of a sliding gear actuating cam.

In FIGS. 3 and 4 of the drawing there are shown the pertinent parts of a multiple spindle metal working machine, generally of the sprocket-chain driven spindle type disclosed in the aforementioned Gridley et al. U.S. Patent 2,055,434, and also embodying the present invention.

Again a spindle carrier barrel member 10 is rotatably indexably supported in the cradle or frame 11 for advancing the several like spindle units 12 from one station to another, for example, in the manner disclosed in the aforementioned Gridley patent; each spindle unit including a chucking mechanism (not shown) for engaging a work-piece to be rotationally driven by the spindle 216 having a spindle sprocket 214 engageable with a driving sprocket chain 215 continually driven by the drive sprocket 213 keyed to a main drive shaft 217. The general organization of the machine, and the elements thus far described, and their functions are such as those of the prior art disclosed in the aforementioned Gridley patent.

However, the main drive shaft 217 has a gear 220 keyed thereto and also an idler gear 221 rotatably mounted thereon by a suitable bearing, the idler gear being in mesh with a gear 222 keyed to an auxiliary shaft 223 rotatably mounted in a part of the machine frame 11. Also keyed to shaft 223 is a rotary member 224a of a magnetic brake 224 including a stationary brake member 224b affixed to the machine frame; also keyed to shaft 223 is the driven member 225a of a magnetic clutch 225. The magnetic clutch includes a driving member 225b rotatably bearinged on shaft 223 and secured to a gear 226 in constant mesh with the main shaft gear 220. Thus, the idler gear may be either driven by shaft 223 or braked relative to the fixed frame 11 upon engagement respectively of the magnetic clutch 225 or brake 224; which are no further detailed here, there being many suitable such devices known to the prior art.

In the specific embodiment of the invention, shown in the drawings with the axial location of a spindle in the loading station coplanar with the axes of main drive shaft 217 and of the carrier, a sliding gear 227 in constant mesh with idler gear 221 is rotatably mounted though axially fixed on a non-rotatable shaft 228 axially shiftably mounted in bracket or guide elements 229, 230 fixed relative to the machine frame 11. The shaft 228 and hence sliding gear 227 is biased inwardly toward engagement (to the right in FIG. 3) by compression spring 231 interposed on the shaft 228 between the guide element 229, and the inner race of the bearing for the sliding gear.

The teeth of the idler gear, as may be noted in FIG. 3, are of sufficient width for maintaining meshed relation with the sliding gear during axial excursions of the latter, into and out of engagement with starter gears 233 rotationally secured to the respective spindles in the manner to be described, the teeth of the starter gears being pointed on the outboard (in FIG. 3 left) side, to permit ready engagement of the sliding gear therewith.

The location of the sliding gear shaft, and the pitch diameter of the sliding gear relative to the idler gear and to the starter gear of a spindle in the chucking or loading station, are selected so that the idler gear and such starter gear can be engaged when the spindle in question is in the loading station.

For shifting the sliding gear and shaft 228, a radial arm 235 projecting from the tubular guide bracket 230 carries a cam roller 236 disposed in the path of like cams 237, each similarly disposed relative to a respective spindle unit 12 and secured to an end wall of the spindle carrier 10.

Each cam 237 has a sloped forward end 237a, a flat area 237b lying in a plane tangential to carrier 10, and an abruptly terminating trailing end 237c, whereby during indexing movement the sliding gear is moved and held out of the path of the incoming starter gear until the latter has come to position where it may be slidably engaged by the sliding gear, at which point the cam roller escapes the cam, permitting spring 231 to shift the sliding gear into engagement with the starter gear.

Here again each pointed tooth starter gear 233 is shown as secured on a chuck fluid power cylinder 253 secured on the back end of a spindle 216 for rotation therewith, but arranged for example, as in the aforementioned Gridley patent for distribution and valving of the operating fluid.

In the contemplated manner of operation, the magnetic clutch 225 and magnetic brake 224 are both de-energized, therefore disengaged, during indexing; a spindle having been reloaded with a new work-piece at a loading station is brought up to speed by energization and engagement of clutch 225 before a next indexing motion of the carrier begins, again with an interlock, e.g., between clutch and indexing means, to insure that this occurs; and the brake is automatically engaged immediately after indexing of a spindle into the loading station.

Generally with this chain type drive the positive spindle clutches 17 of FIGS. 1 and 2 will not be required, since the disengagement and engagement of a spindle sprocket with the drive chain in indexing in and out of the loading station provides a positive clutch function with respect to the continually operating main drive system for the spindles.

Figure 5:
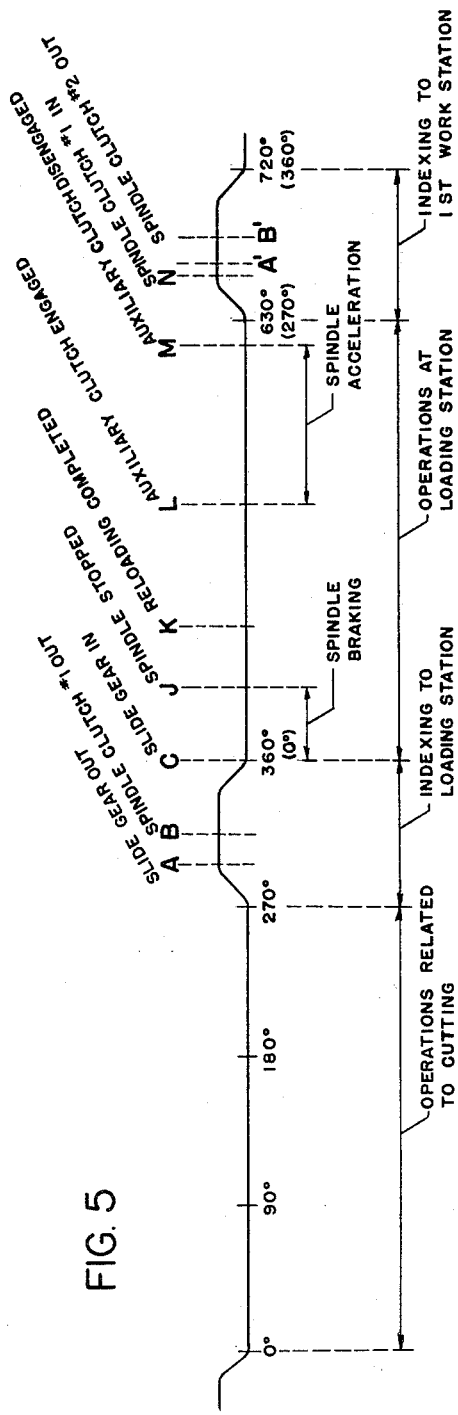
FIG. 5 is a graphical diagram of a suitable sequence of operations for a machine embodying this invention; and, FIG. 6 is a schematic representation of the primary elements of one form of timing control for the clutching and braking functions.

The sequence of events characteristic of operation of a machine embodying the present invention is graphically represented in FIG. 5, with the rotation of a main feed cam or cam shaft used as a basis for reference. In machines of this general character, a single rotation of the feed cam or shaft represents a single cycle of machine operation beginning after an indexing of the carrier; during the first 270° of which, tool feed advance, cutting at the work stations and rapid tool retraction occurs, with unloading and reloading of the spindle at the unloading station; and in the last 90° of which indexing takes place.

FIG. 5 is concerned principally with events occurring at a spindle (denominated "#1 spindle") indexed during a first cycle from the last work station into the loading station, and thereafter during a following cycle indexed into the first work station; the vertically off-set portions of the line representing the period of actual indexing movement.

First, at A the sliding gear 42 (or 227) is shifted out of the path of the spindle starting gear 34 (or 233) coming into the loading station; at B, the engagement with cam 63 of the roller 62 on clutch fork 61 disengages a positive clutch 17 (or a #1 spindle sprocket disengages from the drive chain); and at C, with indexing completed and the carrier stationary (for specific machining operations at each station), the sliding gear re-engages with the starter gear newly come into the loading station, while braking by 41 (or 224) begins.

For the same (#1) spindle in the next cycle (or of course, the spindle immediately in advance thereof during the same cycle), J represents completion of spindle braking begun by 41 (or 224) at or shortly after C; K the completion of the operations of unloading a finished piece and loading of a new piece; L engagement of the electromagnetic clutch 40 (or 225) to accelerate the newly loaded (#1) spindle to normal direct driving or cutting speed; M the disengagement of the electromagentic clutch before indexing begins, with cam shifting of the sliding gear 42 (or 227) out of mesh occurring shortly thereafter at A' by removing slide gear 42 from the path of the incoming next (#2) spindle starting gear; and N the reengagement of the #1 spindle clutch (or of the sprocket drive spindle with the drive chain) to effect a driving by the main spindle drive.

Particularly where a relatively long cutting time is required for an operation at one of the work stations, the rapid braking of the spindle in the work station can provide time during the dwell of a spindle in which an additional operation may be there carried out, either on a work-piece about to be unloaded or a new piece; the location of the additional operation depending upon its character, whether on a new or old piece and the particular control and actuating means adapted for auxiliary drive, clutch, brake and where used spindle clutches.

Here it may be noted that, in a multiple-spindle machine embodying the present invention, advantageously there may be incorporated means to disengage the feed clutch in the event a work-piece is not chucked (e.g. the expedient disclosed in the Brown U.S. Patent 2,083,312 of June 8, 1937; FIGS. 11, 12, 13 thereof, and associated description); or there occurs any other malfunction to be met by such Brown disclosure.

Figure 6:
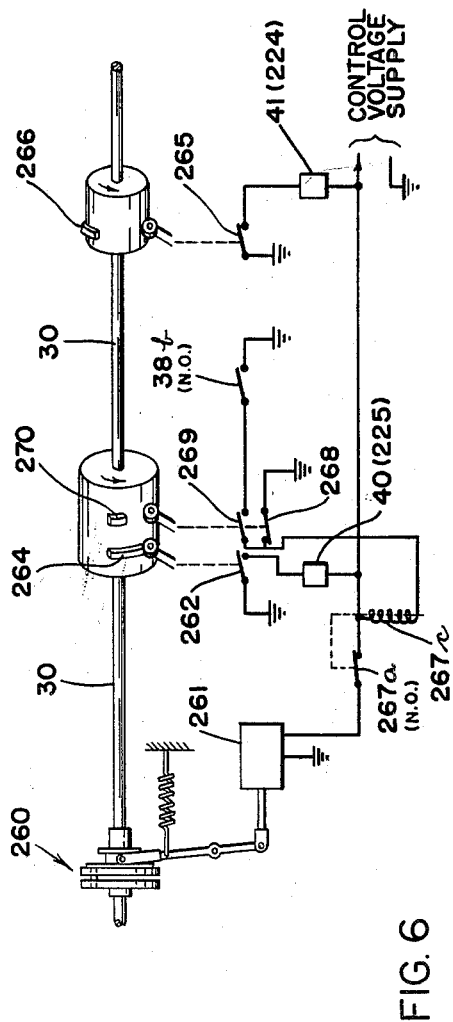

To time the operations of the clutch and the brake in the auxiliary system, various mechanical or electrical-mechanical expedients are available. For example, with manually disabled indexing mechanism such as that disclosed in the above named Barry and Retz U.S. Patent 2,639,493, the electro-mechanical timing control means of schematic FIG. 6 may be used, wherein the disabling clutch of said patent (for preventing normal indexing of the spindle carrier in the course of a rotation of cam shaft 30) is represented by 260, but with the clutch in contrast here being biased to a disengaged condition. The clutch 260, adapted to engage at only one relative position of its driving and driven members, according to said patent then controls a Geneva mechanism effecting the indexing. Further, according to FIG. 6, energization of solenoidal means 261 serves to keep clutch 260 engaged (against the spring bias) for normal operation, but de-energization causes disengagement, thereby to prevent spindle carrier indexing. This modification of the Barry-Retz patent arrangement is intended, in conjunction with the control circuitry next described for provision of an interlock between the auxiliary clutch 40 (or 225) and the indexing mechanism, to prevent indexing of a spindle from the loading station which has not been brought up to speed.

The auxiliary clutch 40 (or 225) is energized for engagement by closure of a normally open cam actuated switch 262 in series therewith across a suitable power source, e.g., a micro-switch closed by a cam 264 (on the main feed cam shaft 30) for the portion of the cycle allotted to spindle acceleration. In similar manner the brake 41 (or 224) is energized to engaged condition by closure of switch 265 by a cam 266 preferably also on shift 30, although cams on the carrier appropriately located relative to respective spindles could be used to actuate such a switch.

The solenoid of 261 is connected to a suitable power source through normally-open contacts 267a of a relay; and the relay solenoid 267c in turn is connected to the power source through normally-closed contacts of a switch 268, while other normally-open cam operated switch contacts 269 are connected in series between 267c and speed responsive switch 38b (here shown as normally open), i.e., the series of 269 and 38b being in parallel with 268.

By a further cam means 270 on shaft 30, there is actuation of switch 268 to open condition and of switch 269 to closed condition for inspection of the speed of the spindle to have been accelerated so that if any malfunction in the auxiliary drive system results in a failure of the spindle to come up to a minimum desired speed before indexing, the clutch 260 will open to prevent indexing. The manner of operation of this form of control with interlock is as follows: Switch 262 is closed by cam 264 (at point L, FIG. 5) energizing the auxiliary drive clutch thereby to accelerate the spindle in the loading station. Attainment of a suitable spindle speed will be represented by a definite speed in shaft 38 which closes switch 38b. At a point in the cycle of rotation of shaft 30, and shortly before indexing is to begin, cam means 270 throws 268 open and 269 closed. With 38b closed, the closing of 269 continues the energization of 267c, and therefore keeps normally-open contacts 267a closed and indexing clutch 260 engaged so that indexing is carried out in a normal cycle of operation.

Were a malfunction in the auxiliary drive to occur, resulting in the newly-loaded spindle not being brought up to speed, contacts 38b would then be open at the time 268 opens to turn over control to 269; this would result in deenergization of relay coil 267c and attendant opening of contacts 267a, thereby deenergizing solenoid 261 and allowing the indexing clutch 260 to open and prevent indexing. Even though closing of 268 after transit of cam 270 results in energization of solenoid 261, tending to engage clutch 260, no indexing will take place during a following revolution of shaft 30, assuming the malfunction to persist, since the described control sequence will again be repeated to put the spindle in question again under the inspection of the circuit branch involving 38b.

In the above system, contacts 268, 269 may comprise a single cam-operated switch unit; and since in the actuation thereof from one condition to the other, both might be simultaneously open, contacts 267a then should be delayed opening contacts, with opening-delay time sufficient to permit the actuation of 268—269 from normal to anti-normal condition without affecting clutch 260; or alternatively, a mechanical linkage from a cam-follower of 270 may be used involving a lost motion connection to 268 permitting 269 to close before opening of 268.

While I have described the invention in detail for the preferred forms shown, it will be understood that modifications may be made without departing from the invention as defined in the claims which follow.

I claim:
1. In a machine of the character described, a spindle carrier rotatably mounting a plurality of spindles and rotatable indexibly mounted in the machine frame; starter gears secured for rotation with respective spindles; main drive means simultaneously driving all spindles except at least one spindle located in a loading station; carrier indexing means for disengaging each spindle from and positively engaging it with said main drive means respectively as it is indexed into and out of said station; a shaft rotatable in the frame driven in constant relation with said main drive means; a gear rotatably supported on the frame and axially slidable into engagement with a spindle starter gear in the loading station; a second gear rotatably supported by the frame and meshed with the slidable gear; means for shifting said sliding gear into and out of engagement with a spindle starter gear respectively upon indexing the respective spindle into the loading station and when the spindle has been loaded with a work-piece; brake means for stopping said second gear and thereby a spindle after indexing into the said station; the shifting means including a shipper on the frame, and a cam on the carrier for each respective spindle; clutch means for coupling said second gear to said shaft whereby a spindle loaded in said station may be accelerated to spindle driving speed before indexing from said station.

2. In a machine of the character described, a spindle carrier rotatably indexably mounted in the machine frame and rotatably mounting a plurality of spindle assemblies; each assembly including a work driving spindle, a spindle input gear and positive clutch means for engaging the spindle with said input gear; said clutch means having an actuating element projecting from the carrier; a continually rotating central drive gear meshed with all said input gears to provide a main drive for the spindles; means on the frame in a loading station region and engageable with the said actuating element of a spindle assembly to disengage each spindle from and engage it with said main driven means respectively upon indexing into and out of said station; a continually-driven shaft rotatable in the frame; rotary means on the frame rotationally engageable with a spindle in the loading station; means for shifting said rotary means into and out of engagement with a spindle respectively when the spindle has been indexed into the loading station and when the spindle has been loaded with a work-piece; brake means for stopping said rotary means and thereby a spindle after indexing into the said station; clutch means for coupling said rotary means to said shaft whereby a spindle loaded in said station may be accelerated to spindle driving speed before indexing from said station.

3. In a machine of the character described, a spindle carrier rotatably indexably mounted in the machine frame and rotatably mounting a plurality of spindle assemblies;

each assembly including a work driving spindle and a spindle drive sprocket thereon; a continually driven sprocket drive chain trained about the drive sprockets of the spindles, excepting a spindle in a work station to provide a main drive for the spindles; a continually driven shaft rotatable in the frame; rotary means on the frame rotationally engageable with a spindle in the loading station; means for shifting said rotary means into and out of engagement with a spindle respectively when the spindle has been indexed into the loading station and when the spindle has been loaded with a work-piece; brake means for stopping said rotary means and thereby a spindle after indexing into the said station; clutch means for coupling said rotary means to said shaft whereby a spindle loaded in said station may be accelerated to spindle driving speed before indexing from said station.

4. In a machine of the character described including a spindle carrier rotationally indexable in the machine frame, means for indexing the carrier, a plurality of spindles rotatably mounted therein, and means for simultaneously driving all but at least one of said spindles located in a loading station, the combination comprising: means for disengaging each spindle from and re-engaging it with the driving means upon indexing into and out of the loading station respectively, and an auxiliary spindle braking and accelerating system for quickly stopping a spindle before a loading station operation, and accelerating the same to spindle drive speed before indexing out of the loading station; said system including a starter gear on each spindle, a second gear rotatably mounted on said frame, a shiftable gear mounted in the frame shiftable from a position of engagement with both a starter gear at the loading station and said second gear to a position out of the path of a starter gear coming into the loading station, means for shifting the gear out of said path during indexing carrier movement and into engaged position on completion of indexing, brake means for stopping said second gear and thereby a spindle indexed into the loading station, and means including a clutch for connecting said second gear to a constantly driven shaft to accelerate a loaded spindle to a speed approximating spindle speed obtained from the drive means.

5. In a machine as described in claim 4, cam means for shifting said shiftable gear in and out of engaged position, said cam means including a cam on the carrier for each respective spindle.

6. In a machine as described in claim 4, timing cam controlled means for engaging and releasing said brake means and said clutch at predetermined times in relation to an indexing cycle of the machine.

7. In a machine as described in claim 6, interlock means between the clutch means and the indexing mechanism for preventing indexing upon failure of a spindle to accelerate to a preselected speed at the loading station.

8. In a machine as described in claim 7, said interlock means including a speed responsive switch sensing the speed of a rotary element in the line of motion transmission from said clutch to said starter gears.

9. In a machine as described in claim 4, said driving means comprising a continuously driven central gear coaxial with the carrier, input gears on respective spindles and constantly meshed with the central gear, and a cam actuated positive clutch on each spindle for clutching the spindle and input gear; said clutch being actuated upon successive indexing motions of said carrier to disengage and reengage.

10. In a machine as described in claim 4, said driving comprising a drive sprocket on each spindle and a continuously driven endless sprocket chain trained over all spindles outside of the loading station.

References Cited in the file of this patent
UNITED STATES PATENTS

| | | |
|---|---|---|
| 1,984,052 | Bullard | Dec. 11, 1934 |
| 2,646,152 | Retz | July 21, 1953 |
| 2,876,527 | Matlachowsky | Mar. 10, 1959 |